(12) United States Patent  
Davis

(10) Patent No.: US 7,695,148 B1
(45) Date of Patent: Apr. 13, 2010

(54) REAR VIEW MIRROR GPS HOLDER

(76) Inventor: Katherine C. Davis, 123 Haverhill Rd., Topsfield, MA (US) 01983

( * ) Notice: Subject to any disclaimer, the term of this patent is extended or adjusted under 35 U.S.C. 154(b) by 0 days.

(21) Appl. No.: 12/266,931

(22) Filed: Nov. 7, 2008

(51) Int. Cl.
*G02B 7/182* (2006.01)
*B60R 1/04* (2006.01)

(52) U.S. Cl. .................. 359/871; 359/872; 701/213
(58) Field of Classification Search .......... 359/841, 359/844, 871, 872, 881; 340/988; 701/213
See application file for complete search history.

(56) References Cited

U.S. PATENT DOCUMENTS

| | | | |
|---|---|---|---|
| 2,671,977 A | 3/1954 | Lingard | |
| 2,990,637 A | 7/1961 | Saben | |
| D234,592 S | 3/1975 | Callaway | |
| 3,954,328 A * | 5/1976 | Ames | 359/865 |
| D310,167 S | 8/1990 | Reber, II | |
| 5,432,496 A * | 7/1995 | Lin | 340/468 |
| 5,598,653 A | 2/1997 | Schaefer | |
| 5,649,317 A * | 7/1997 | Suzuki | 455/345 |
| 5,938,321 A * | 8/1999 | Bos et al. | 362/494 |
| 6,124,886 A * | 9/2000 | DeLine et al. | 348/148 |
| 6,125,566 A | 10/2000 | McLaughlin | |
| 6,132,051 A * | 10/2000 | Morell et al. | 359/844 |
| 6,163,997 A | 12/2000 | Deralas | |
| 6,333,759 B1 * | 12/2001 | Mazzilli | 348/148 |
| 6,428,172 B1 * | 8/2002 | Hutzel et al. | 359/838 |
| 6,549,793 B1 * | 4/2003 | Baratono | 455/569.2 |
| 6,585,201 B1 * | 7/2003 | Reed | 248/181.1 |
| 6,634,532 B1 | 10/2003 | Maguire | |
| 6,690,268 B2 * | 2/2004 | Schofield et al. | 340/438 |
| D506,863 S | 7/2005 | Lee et al. | |
| 2007/0175076 A1 | 8/2007 | Stanley | |
| 2008/0169402 A1 * | 7/2008 | Sturt | 248/326 |

* cited by examiner

*Primary Examiner*—Ricky D Shafer
(74) *Attorney, Agent, or Firm*—Kyle Fletcher

(57) ABSTRACT

The invention is a rear view mirror GPS holder that is composed of a pair of telescoping arms that are hingedly connected and of which hang from a neck of a rearview mirror. An opposing end of the telescoping arms attach to GPS holder. The ends of the telescoping arms have a plurality notches that correspond with a retaining clip located on the GPS holder. The hinge connecting the telescoping arms may be spring-loaded in order to apply a biasing force separating the telescoping arms thereby securing the telescoping arms with respect to the retaining clip.

12 Claims, 6 Drawing Sheets

REAR VIEW MIRROR GPS HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of GPS holders, more specifically, a GPS holder that can attach to any rearview mirror.

B. Discussion of the Prior Art

As a preliminary note, it should be stated that there is an ample amount of prior art that deals with rear view mirror GPS holder. As will be discussed immediately below, no prior art discloses a rear view mirror GPS holder.

The Schaefer Patent (U.S. Pat. No. 5,598,653) discloses a retractable signage device that is attachable to a rearview mirror of a vehicle, and of which includes a flexible strap and housing. However, the means of attachment do not involve telescoping arms that hingedly connect about the top of the neck of the rear view mirror and of which enable a GPS unit to dangle below said rear view mirror.

The Deralas Patent (U.S. Pat. No. 6,163,997) discloses a vehicle mountable picture frame. However, the picture frame mounting assemblage does not involve the use of a rearview mirror.

The Lingard Patent (U.S. Pat. No. 2,671,977) discloses a road map support for motor vehicles that drapes over the neck of a rearview mirror. However, the support requires adjustable members on each side in order to secure the map in place and prevent swaying from side to side.

The Saben Patent (U.S. Pat. No. 2,990,637) discloses a mirror mounted auxiliary object holder. However, the holder does not connect to the neck of the rearview mirror.

The Callaway Patent (U.S. Pat. No. Des. 234,592) illustrates a design for an adjustable clipboard for attachment to an automobile mirror. However, the attachment does not connect to the neck of a rearview mirror.

The Maguire Patent (U.S. Pat. No. 6,634,532) discloses a car map holder that fastens upon the top surface of a dashboard. However, the map holder does not hang down from the neck of a rearview mirror.

The McLaughlin Patent (U.S. Pat. No. 6,125,566) discloses a picture frame holder for use with a vehicle dashboard. Again, the picture frame holder does not mount from the neck of a rearview mirror.

The Lee et al. Patent (U.S. Pat. No. D506,863) illustrates an automobile navigation holder, which illustrates no claimed design that would hang below a rearview mirror.

The Reber, II Patent (U.S. Pat. No. Des. 310,167) illustrates a design for a radar warning visor clip, which would presumably hang down from a sun visor and not from the neck of a rearview mirror.

The Stanley Patent Application Publication (U.S. Pub. No. 2007/0175076) discloses an indicia displaying interior rearview mirror device. However, the device displays a logo that is viewable from outside of the vehicle, and of which does not support a GPS unit.

While the above-described devices fulfill their respective and particular objects and requirements, they do not describe a rear view mirror GPS holder that provides for the advantages of the rear view mirror GPS holder. In this regard, the rear view mirror GPS holder departs from the conventional concepts and designs of the prior art.

SUMMARY OF THE INVENTION

The invention is a rear view mirror GPS holder that is composed of a pair of telescoping arms that are hingedly connected and of which hang from a neck of a rearview mirror. An opposing end of the telescoping arms attach to GPS holder. The ends of the telescoping arms have a plurality notches that correspond with a retaining clip located on the GPS holder. The hinge connecting the telescoping arms may be spring-loaded in order to apply a biasing force separating the telescoping arms thereby securing the telescoping arms with respect to the retaining clip.

It is an object of the invention to provide a GPS holder that hangs from the neck of a rearview mirror.

A further object of the invention is to provide a GPS holder that has minimal windshield view obstruction.

A further object of the invention is to provide a GPS holder that is lightweight, secure, simple to install, and affordable.

These together with additional objects, features and advantages of the rear view mirror GPS holder will be readily apparent to those of ordinary skill in the art upon reading the following detailed description of presently preferred, but nonetheless illustrative, embodiments of the rear view mirror GPS holder when taken in conjunction with the accompanying drawings.

In this respect, before explaining the current embodiments of the rear view mirror GPS holder, it is to be understood that the rear view mirror GPS holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rear view mirror GPS holder. It is therefore important that the claims be regarded as including such equivalent construction insofar as they do not depart from the spirit and scope of rear view mirror GPS holder. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
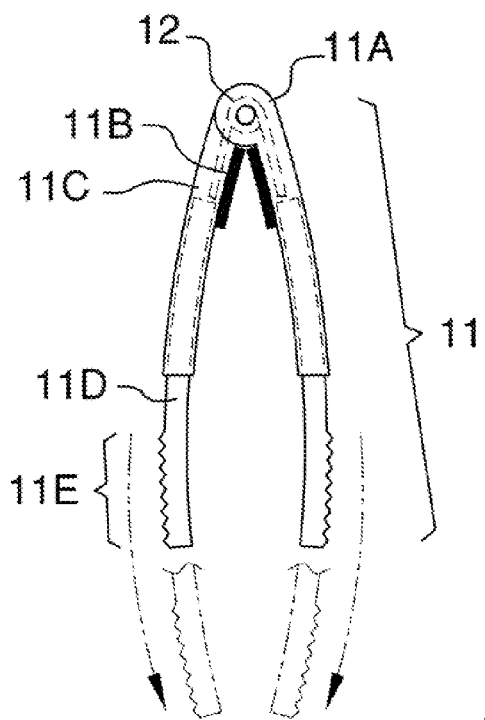
FIG. 1 illustrates a front view of the telescoping arms.
Figure 2:
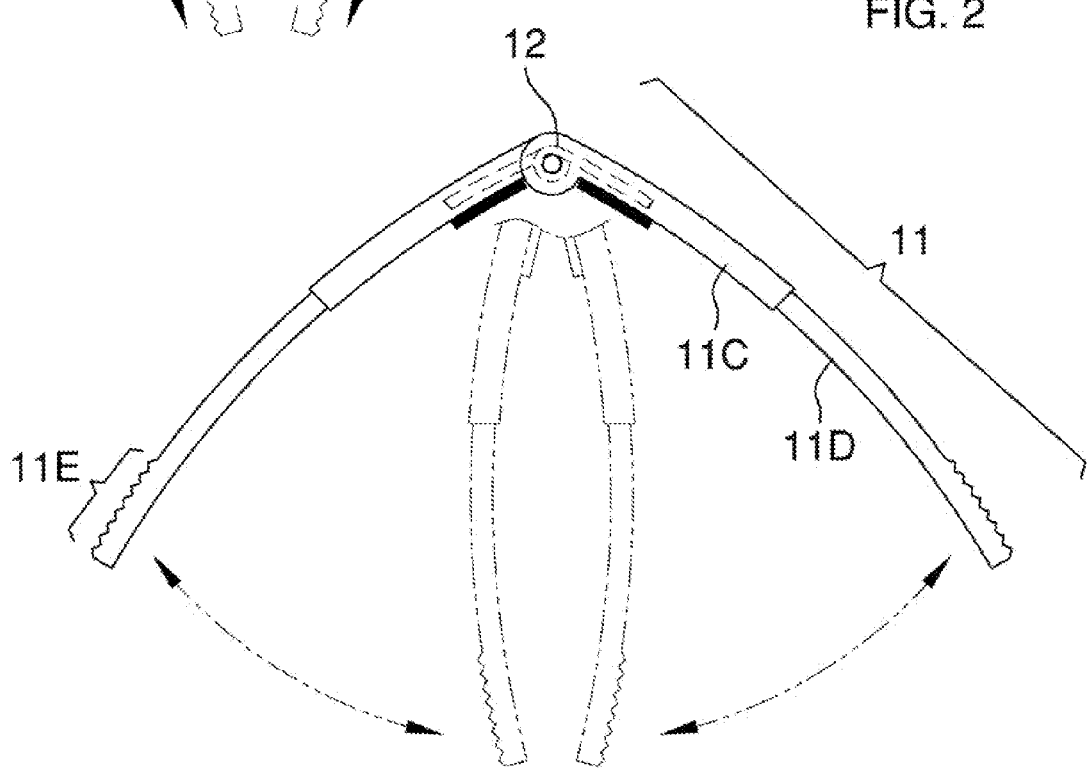
FIG. 2 illustrates a front view of the telescoping arms rotating about a hinge.
Figure 3:
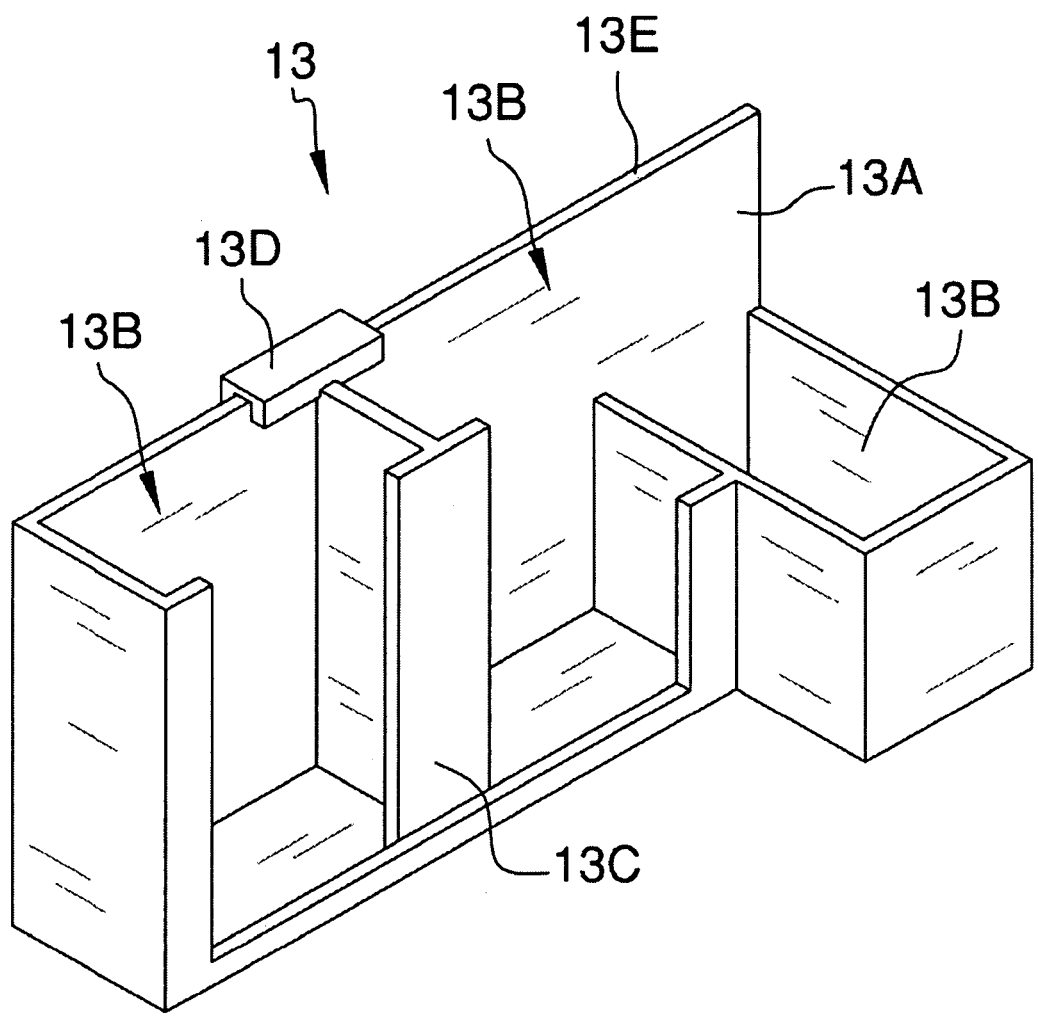
FIG. 3 illustrates a front, isometric view of the GPS holder.
Figure 4:
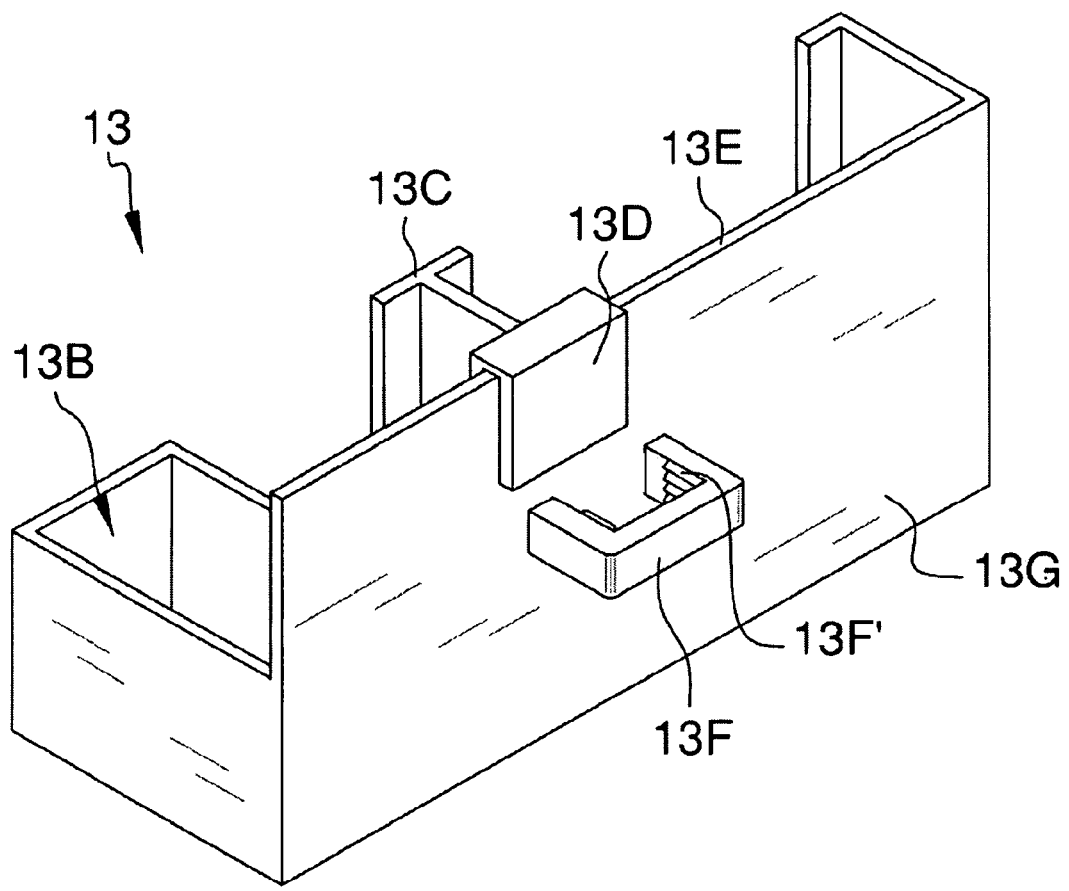
FIG. 4 illustrates a rear, isometric view of the GPS holder.
Figure 5:
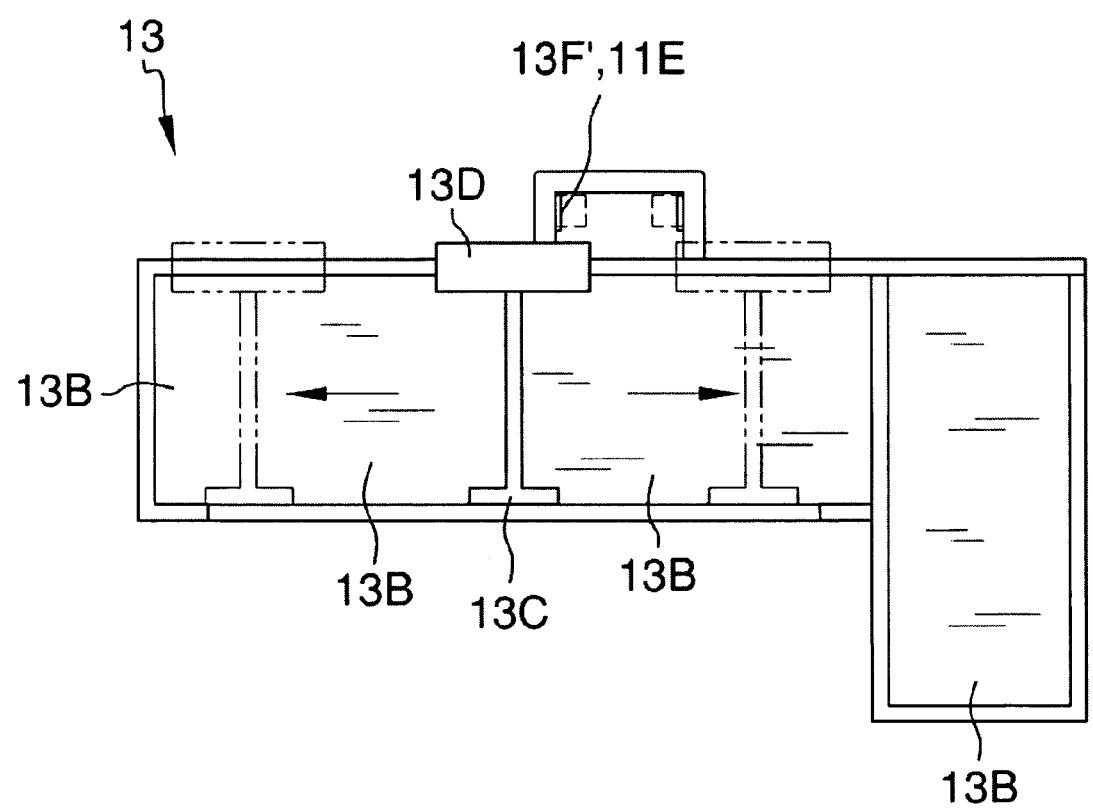
FIG. 5 illustrates a top view of the GPS holder with hidden lines indicating movement of the divider.
Figure 6:
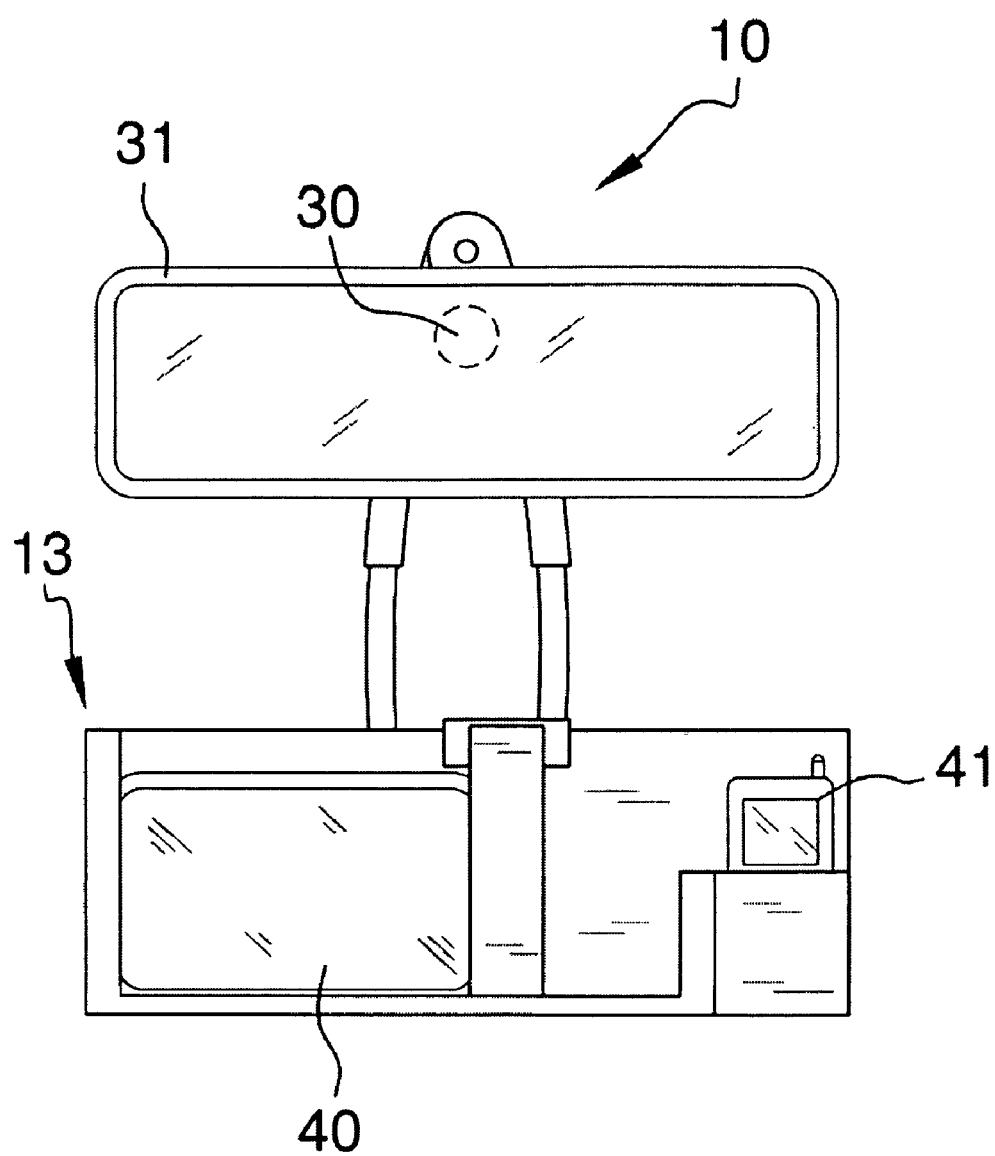
FIG. 6 illustrates a front view of the invention installed upon a rear view mirror with a GPS unit and cell phone.
Figure 7:
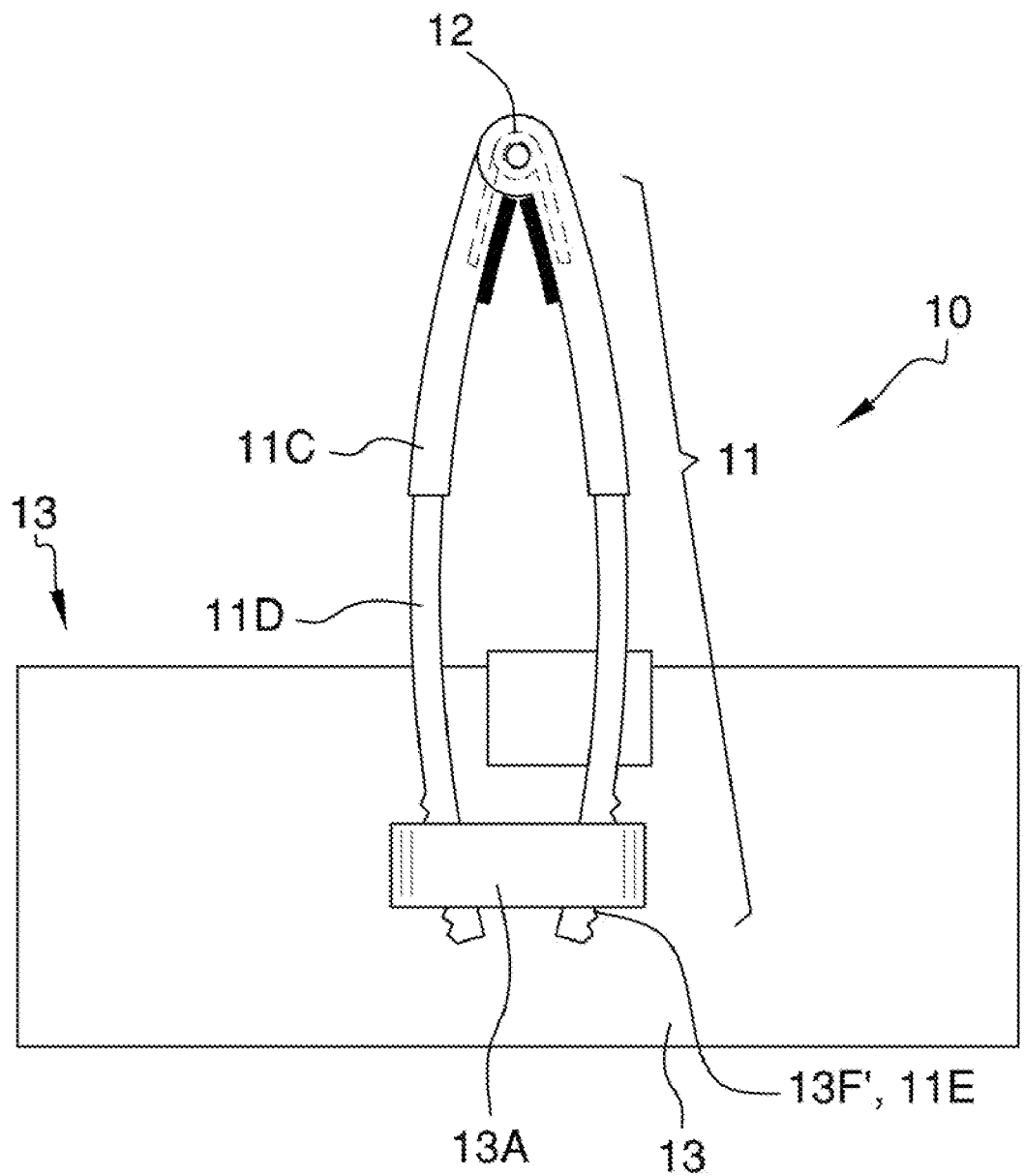
FIG. 7 illustrates a rear view of the invention by itself.

Detailed reference will now be made to the preferred embodiment of the present invention, examples of which are illustrated in FIGS. 1-7. A rear view mirror GPS holder 10 (hereinafter invention) includes a pair of telescoping arms 11, a hinge 12, and a GPS holder 13.

The pair of telescoping arms 11 connects to each other along a first end 11A via the hinge 12. The telescoping arms 11 may have a foam pad 11B near the first end 11A in order to provide a more secure fit about a neck 30 of a rearview mirror 31.

The telescoping arms 11 are comprised of a top half 11C and bottom half 11D. The bottom half 11D can extend and retract into the top half 11C as depicted in FIG. 1. However, it shall be noted that an alternative embodiment of the invention 10 may include telescoping arms 11 that do not extend or retract, and thus do not telescope.

The GPS holder 13 has a front surface 13A that includes a plurality of compartments 13B. A movable divider 13C is also located along the front surface 13A, and enables adjustment to the width of two of the compartments 13B, see FIG. 5. The divider 13C attaches via a clip 13D at a top edge 13E of the GPS holder 13. It shall be noted that the compartments 13B are capable of accommodating other items besides a GPS unit 40, and comprise a cell phone 41, a radar detector (not shown), a wallet (not shown), and other items of like sizes.

The telescoping arms 11 have securing means 11E located on the exterior side of the bottom half 11D. The GPS holder 13 has a retaining clip 13F that is located on a rear surface 13G of the GPS holder 13. The interior side surfaces of the retaining clip 13F incorporate securing means 13F', which correspond to the securing means 11E. The securing means 11E and 13C are depicted as a plurality of notches, which enable the location of the bottom half 11D to be adjusted with respect to the retaining clip 13F, see FIG. 7.

It shall be noted that the hinge 12 may be spring-loaded in order for the telescoping arms to extend away from one another.

The telescoping arms 11, the hinge 12, and the GPS holder 13 may be made of a material comprising metal, plastic, or wood.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rear view mirror GPS holder comprising:
   (a) a pair of telescoping arms;
   (b) a hinge;
      wherein the hinge connects the telescoping arms along a first end;
      wherein the telescoping arms and hinge hang down from a neck of a rearview mirror;
   (c) a GPS holder;
      wherein the GPS holder has a retaining clip along a rear surface;
      wherein a second end of the telescoping arms attaches to the retaining clip of the GPS holder by a securing means;
      wherein the GPS holder has a means for fastening a GPS unit to a front surface such that said GPS unit is viewable from just below said rearview mirror of a vehicle.

2. The rear view mirror GPS holder as described in claim 1 wherein the telescoping arms have a foam pad located next to the first end.

3. The rear view mirror GPS holder as described in claim 2 wherein the hinge has a spring that biases the telescoping arms apart from one another.

4. The rear view mirror GPS holder as described in claim 3 wherein the securing means comprises a plurality of notches along the interior of the retaining clip and corresponding notches along the exterior of the second end of the telescoping arms; and
   whereupon said notches and corresponding notches secure the retaining clip onto the telescoping arms.

5. The rear view mirror GPS holder as described in claim 4 wherein the fastening means comprises an adhesive, a clip, or nylon hook and loop strips.

6. The rear view mirror GPS holder as described in claim 5 wherein the telescoping arms, hinge, and GPS holder are made of a material comprising metal, plastic, or wood.

7. A rear view mirror GPS holder comprising:
   (a) a pair of telescoping arms;
   (b) a hinge;
      wherein the hinge connects the telescoping arms along a first end;
      wherein the telescoping arms and hinge hang down from a neck of a rearview mirror;
   (c) a GPS holder;
      wherein the GPS holder has a retaining clip along a rear surface;
      wherein the GPS holder has a plurality of compartments along a front surface;
      wherein a second end of the telescoping arms attaches to the retaining clip of the GPS holder by a securing means;
      wherein the GPS holder has a means for fastening a GPS unit to the front surface such that said GPS unit is viewable from just below said rearview mirror of a vehicle.

8. The rear view mirror GPS holder as described in claim 7 wherein the telescoping arms have a foam pad located next to the first end.

9. The rear view mirror GPS holder as described in claim 8 wherein the hinge has a spring that biases the telescoping arms apart from one another.

10. The rear view mirror GPS holder as described in claim 9 wherein the securing means comprises a plurality of notches along the interior of the retaining clip and corresponding notches along the exterior of the second end of the telescoping arms; and
    whereupon said notches and corresponding notches secure the retaining clip onto the telescoping arms.

11. The rear view mirror GPS holder as described in claim 10 wherein the GPS holder includes a divider along the front surface in between two of the compartments, such that the divider can adjust the width of the two compartments divided by the divider.

12. The rear view mirror GPS holder as described in claim 11 wherein the telescoping arms, hinge, and GPS holder are made of a material comprising metal, plastic, or wood.

* * * * *